United States Patent [19]

Lee et al.

[11] Patent Number: 5,801,505

[45] Date of Patent: Sep. 1, 1998

[54] DISK DRIVE STICTION RELEASE SYSTEM

[75] Inventors: Jia-Kuen Jerry Lee, San Jose; Hong Tian, Milpitas; Martin Smallen, LaHonda; Mike Workman, Saratoga, all of Calif.

[73] Assignee: Seagate Technology, Inc., Scotts Valley, Calif.

[21] Appl. No.: 835,837

[22] Filed: Apr. 23, 1997

Related U.S. Application Data

[63] Continuation of Ser. No. 370,445, Jan. 9, 1995, abandoned.

[51] Int. Cl.[6] .................................................. H02K 23/16
[52] U.S. Cl. .......................... 318/437; 318/254; 318/138;
318/439; 318/606; 318/798; 318/799; 318/800;
318/801; 318/802; 318/803; 318/804; 318/805;
318/806; 318/807; 318/808; 318/809; 318/810;
318/811; 318/812; 318/813; 318/814; 318/815;
360/75; 360/73.03; 360/98.01; 360/97.01;
360/99.07
[58] Field of Search .......................... 318/437, 254,
318/138, 439, 606, 798–815; 360/75, 73.03,
98.01, 98.04, 97.01, 99.07

[56] References Cited

U.S. PATENT DOCUMENTS 4,532,802  8/1985  Yeack-Scranton et al. ............ 360/75
5,384,675  1/1995  Crawforth et al. .................... 360/75
5,397,971  3/1995  McAllister et al. .................. 318/254

FOREIGN PATENT DOCUMENTS

0 110 006  6/1984  European Pat. Off. .......... G11B 5/54

*Primary Examiner*—Karen Masih
*Attorney, Agent, or Firm*—Flehr Hohbach Test Albritton & Herbert LLP

[57] ABSTRACT

A disk drive including firmware for overcoming stiction and breaking free the heads of a disk drive which may adhere to the disk surface when the disk is at rest. Upon start-up of the disk drive, if stiction at the head/disk interface occurs, the voltage to the spindle motor and/or actuator motor may be rapidly fluctuated so as to cause a pulsing of the spindle motor and/or actuator motor. Pulsing both the spindle motor and actuator motor creates forces in a plurality of radial directions to allow the head(s) to break free from the disk(s) in the direction of least resistance. Moreover, as the resonant frequency of the spindle motor varies depending on the number of heads that are stuck, the firmware pulses over a range of frequencies including the various resonant frequencies of the spindle motor corresponding to various numbers of heads stuck.

34 Claims, 5 Drawing Sheets

DISK DRIVE STICTION RELEASE SYSTEM

This is a continuation, of application Ser. No. 08/370,445 filed Jan. 9, 1995 now abandoned.

FIELD OF THE INVENTION

The present invention relates to a data storage device, and more particularly, to a disk drive including firmware for pulsing both the spindle motor and the actuator upon start-up of the disk drive over a predetermined range of frequencies to overcome stiction at the head/disk interface regardless of how many of the heads are stuck to the disk surfaces.

BACKGROUND OF THE INVENTION

Conventional disk drives for use in work stations, personal computers, and portable computers are required to provide a large amount of data storage within a minimum physical space. In general, disk drives operate by positioning a read/write transducing head over respective tracks on a magnetic storage disk. Positioning of the head over the tracks is accomplished by an actuator coupled with control electronics, which control the positioning of the actuator and the read/write functions of the heads. During non-operational periods of the drive, the head in many drive designs is landed on a non-data carrying zone of the disk at either the inner or outer diameter of the disk.

A significant source of failure in a disk drive arises from a phenomenon known as stiction. A head slider tends to adhere to the disk surface in the landing zone when the head is at rest on the disk. Upon start-up of the disk drive, the limited motor torque cannot overcome the stiction force at the head/disk interface and thus the drive cannot spin-up for normal operation. Stiction may arise from one or more of several causes. First, liquid lubricant on the disk surface tends to migrate into the head/disk interface to generate high stiction due to a meniscus effect. Such a liquid lubricant is commonly used on the disk surfaces to increase wear resistance of the head/disk interface. Second, any other liquid, like water vapor and lubricants used for other components in the disk drive may also get into the head/disk interface and thus cause stiction problems. Third, outgassing may result in the formation of adhesive-like materials on the disk surface, thereby causing stiction at the head/disk interface. Finally, as the flying height of the magnetic head over the magnetic disk is decreased to allow higher magnetic recording densities, disk and head surfaces have to be very smooth to minimize head/disk contact while the drive is in operation. Generally smooth surfaces lead to larger contact area between the head and disk surfaces, thereby causing higher stiction at the head/disk interface.

The present trend toward miniaturization of disk drives and drive components further complicates the problem of reducing stiction at the head/disk interface. In the current generation disk drives, the size of the spindle motor and power output therefrom have been reduced to the point where the stiction force at the head/disk interface is significant as compared to the torque output of the spindle motor.

Several solutions have been offered to overcome to problem of stiction. One solution is to texture the landing zone on the disk as disclosed for example in U.S. Pat. No. 4,973,496 to Kruger et al. and in U.S. Pat. No. 5,062,021 to Ranjan et al. Texturing the landing zone results in a rough disk surface. Therefore the contact area of the head on the disk surface is reduced, which in turn reduces stiction. However, a fundamental disadvantage of rough disk surfaces is that the head will contact the disk surfaces at low head flying heights, which in turn will cause early failure of the head/disk interface. Some conventional disk drives have textured surfaces only in the landing zone. However, selective texturing of the disk surface results in different elevations of the disk surface between the textured zone and the untextured zone. As a result, the head often contacts the higher elevation portion of the disk when traveling from the textured to the untextured portion of the disk, which contact can damage the head and shorten longevity of the disk drive.

Another method for overcoming stiction is taught in U.S. Pat. No. 4,970,610 to Knappe entitled "Magnetic Disk Drive Start Procedure for Starting Reaction Torque Amplification". Knappe disclosed pulsing the spindle motor upon start-up of the drive, at a frequency approaching the resonant frequency of the motor when all the heads are completely stuck to the disk surfaces. Pulsing at the resonant frequency of the spindle motor reinforces and amplifies the effective torque from the spindle motor and the amplified force will break free the heads from the disk surfaces. However, the resonant frequency of the motor will vary depending on the number of heads which are actually stuck to the disk surfaces. Since a drive generally includes a plurality of heads and disks, it is very likely that not all of the heads are stuck to the disk surfaces. When many of the heads are stuck, the resonant frequency of the spindle motor will be high. Conversely, when only a few heads are stuck, the resonant frequency will be relatively low. Therefore, setting the pulse frequency of the spindle motor for a single case where all of the heads are stuck to the disk surfaces will result in an improper pulsing when stiction occurs at less than all of the head/disk interfaces.

Furthermore, the amplified force resulting from pulsing of the spindle motor is only in the direction of disk rotation. But stiction at the head/disk interface has, in general, direction preference, i.e., the stiction force may be smaller in a direction other than the direction of the disk rotation. Since the above method of pulsing the spindle motor can only generate a breaking force in the direction of disk rotation, this generated force may be inefficiently directed and may not be sufficient to break free heads from disk surfaces for various instances of stiction.

SUMMARY OF THE INVENTION

It is therefore an advantage of the present invention to provide a system for overcoming stiction at the head/disk interface upon start-up of a disk drive.

It is a further advantage of the present invention to pulse the spindle motor and the actuator simultaneously at a same frequency but with a phase lag to break free the heads from the disk surface by generating resultant forces that continuously change in the angular direction so as to overcome stiction in the direction of least resistance.

It is a still further advantage of the present invention to pulse the spindle motor and the actuator simultaneously at different frequencies to break free the heads from the disk surface by generating resultant forces that continuously change in the angular direction so as to overcome stiction in the direction of least resistance.

It is another advantage of the present invention to pulse the spindle motor and the actuator simultaneously over a range of predetermined resonant frequencies of the spindle motor to break the heads free regardless of how many heads are actually stuck to the disk surfaces.

These and other advantages are accomplished by the present invention which relates to a disk drive including firmware for breaking free the heads of the disk drive which may adhere to the disk surfaces after the heads have been at rest on the disk surfaces. As explained in the Background of the Invention section, stiction in one direction may be smaller than stiction in another direction. By applying forces alternatively in various directions around the head/disk interface, the heads may be broken free from the disk surfaces in the direction in which stiction is at its minimum. Upon start-up of the disk drive, if the available motor torque cannot overcome the stiction force at the head/disk interface and fails to spin-up the disks, the electric current to the spindle motor and/or to the actuator will be rapidly fluctuated so as to cause fretting motions of the spindle motor and/or the actuator. The resultant forces can be alternatively generated at the head/disk interface in a plurality of directions around the head/disk interface by pulsing the spindle motor and the actuator at a same frequency but with a phase lag of $\pi/2$. Another way of generating resultant forces in the plurality of directions is to pulse the spindle motor and the actuator simultaneously at the resonant frequency of the spindle motor. If the pulsing frequencies are close to the resonant frequencies of the motor or the actuator, the forced vibration at these frequencies will have a certain amount of phase lag. This phase lag will result in the resultant forces at the head/disk interface in a plurality of directions.

The resonant frequency of the actuator has very weak dependence on how many heads are stuck to the disk surfaces and is much higher than the resonant frequency of the spindle motor. Therefore, the amplified resultant forces are generated by pulsing the motor at several predetermined frequencies which correspond to the resonant frequencies of one head being stuck, two heads being stuck, etc. and by simultaneously pulsing the actuator at the same frequencies as the motor.

Firmware according to an exemplary embodiment of the present invention is implemented in a retry mode, i.e., when an attempt has been made to start rotation of the disks but stiction has prevented disk rotation.

BRIEF DESCRIPTION OF THE DRAWINGS

The invention will now be explained with reference to the FIGS. in which.

DETAILED DESCRIPTION

The invention will now be described with reference to FIGS. 1–6, which relates in general to a disk drive including firmware for overcoming stiction upon start-up of a disk drive. It is understood that the present invention may operate with disk drives of various designs and sizes. Moreover, it is understood that the function and results of the firmware in the present invention may be implemented by means other than firmware resident in a read only memory. For example, as is known in the art, the advantages of the present invention may be accomplished by down loading software from a disk, or a dynamic memory source such as a random access memory resident within the host computer. Additionally, as is further known in the art, it is understood that the function and results of the firmware according to the present invention may be implemented by hardwiring the program into a programmable logic array within the host computer.

Figure 1:
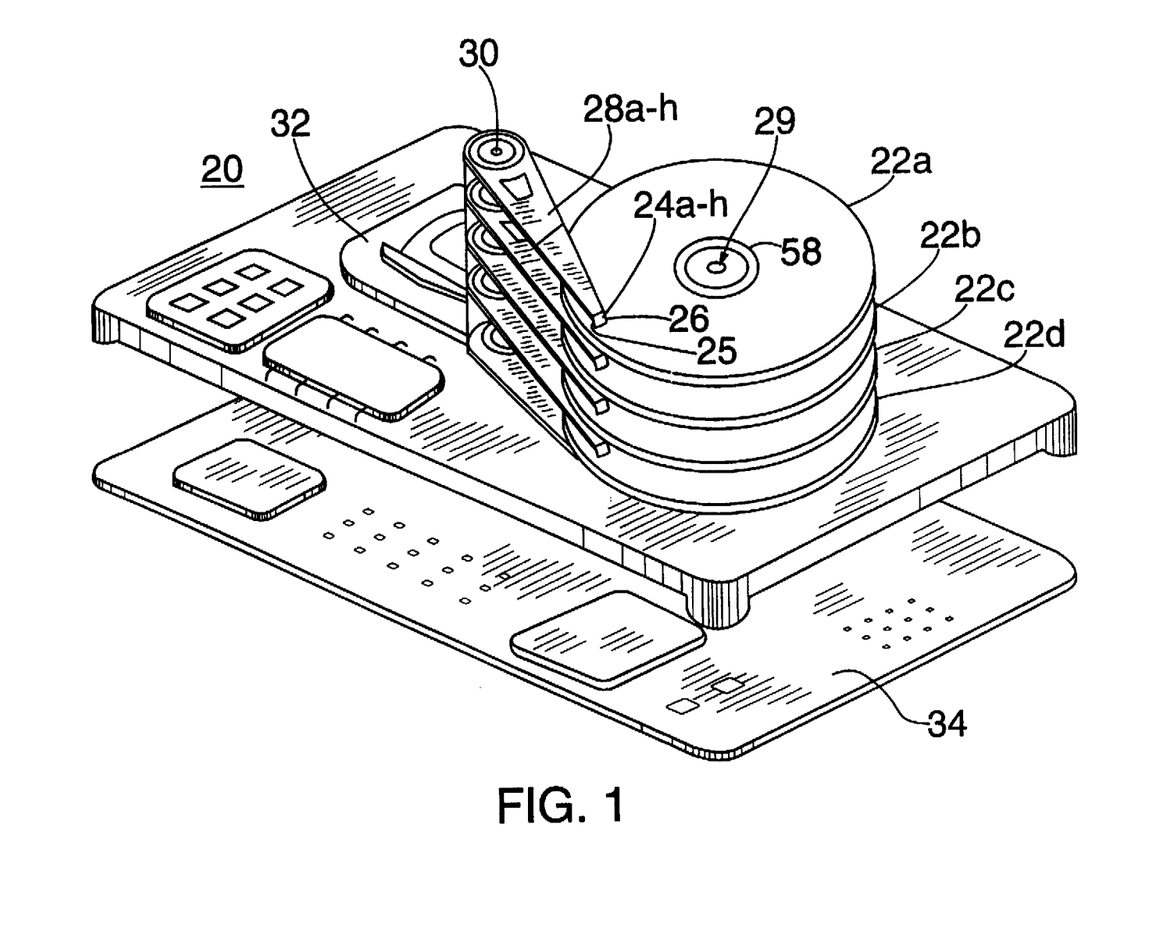
FIG. 1 is a perspective view of a disk drive according to the present invention.

Referring now to FIG. 1, there is shown a disk drive 20 including a plurality of storage disks 22a–d and a plurality of read/write heads 24a–h. One head 24 is provided for each surface of the four disks of disks 22a–d. It is understood that the disk drive 20 may include more or less than the above-disclosed number of disks and heads in alternative embodiments. Each read/write head 24 comprises a transducer 25 mounted to a slider 26. The slider 26 of each head 24a–h is in turn supported on actuator arms 28a–h. Transducer 25 may be a conventional inductive transducing element, or in an alternative embodiment, may be a magneto-resistive (MR) transducing element. Actuator arms 28a–h are provided to pivot around pin 30 by voice coil motor 32. As is known in the art, during operation of the drive 20, disks 22a–d are rotated by a spindle motor 29 and actuator arms 28a–h pivot read/write heads 24a–h across the surfaces of the disks so that data can be transferred between the read/write heads 24a–h and the disks 22a–d in a plurality of concentric data tracks. Rotation of the disks cause a cushion of fluid to form between the sliders 26 and the surface of the disks, such that the heads 24a–h "fly" above the surface of the disks during operation of the disk drive. The sliders 26 carry the respective read/write heads 24a–h.

Figure 2:
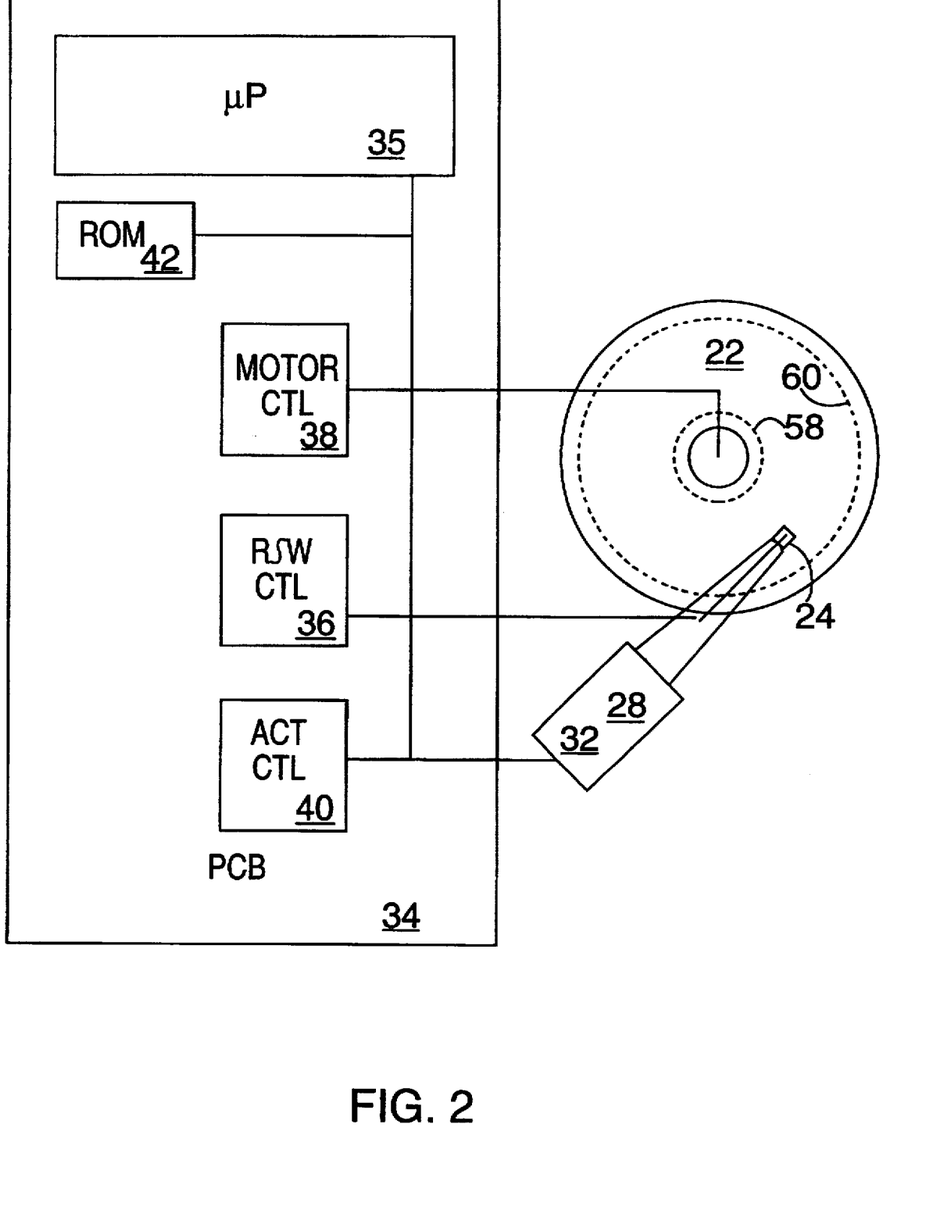
FIG. 2 is a schematic representation of the printed circuit board and the head/disk assembly according to the present invention.

As shown in FIGS. 1 and 2, the disk drive 20 further includes a printed circuit board (PCB) 34 having the data transfer and control electronics for the drive. A microprocessor 35 is provided on the PCB 34 for sending data to, and for receiving data and information from, the disks 22a–d via the heads 24a–h and the read/write controller 36. The microprocessor 35 further provides a signal to the spindle motor controller 38, which in turn supplies a voltage to the stator of the spindle motor 29 to thereby control the rotational speed of the motor. Similarly, the microprocessor 35 provides a signal to the actuator controller 40, which in turn supplies a voltage to winding terminals of the voice coil motor 32 to thereby control the axial position of the actuator arms 28a–h and the heads 24a–h with respect to disks 22a–d. As is known in the art, the PCB 34 further includes a read-only memory (ROM) chip 42 coupled to the microprocessor 35 for storing a control program for the disk drive 20. The firmware according to the present invention is part of the control program, and is resident in ROM 42.

During spin-down of the disks 22a–d upon shut-down of the spindle motor of the disk drive, the heads 24a–h are pivoted to a landing zone 58 at the inner diameter of the disks 22a–d. In an alternative embodiment, the landing zone may be located at an outer diameter landing zone 60. Once the angular velocity of the disks 22a–d has slowed sufficiently, the heads 24a–h land on the landing zone 58 or 60, and remain in contact with a section of the landing zone until the next subsequent start-up of the disk drive. As explained in the Background of the Invention section, prolonged contact between the heads and disks during non-operational periods of the drive may result in high stiction at one or more of the head/disk interfaces. In order to overcome the stiction forces so that the disks may rotate and the heads may fly over the disks, the present invention includes a stiction release code as part of the drive firmware for pulsing the spindle motor and/or the voice coil motor over a range of discrete frequencies. The stiction release code is executed in a "retry mode"; namely, when an attempt has been made to start rotation of the disks but stiction has prevented disk rotation. The stiction release code may alternatively be executed upon each start-up of the drive 20.

Figure 3:
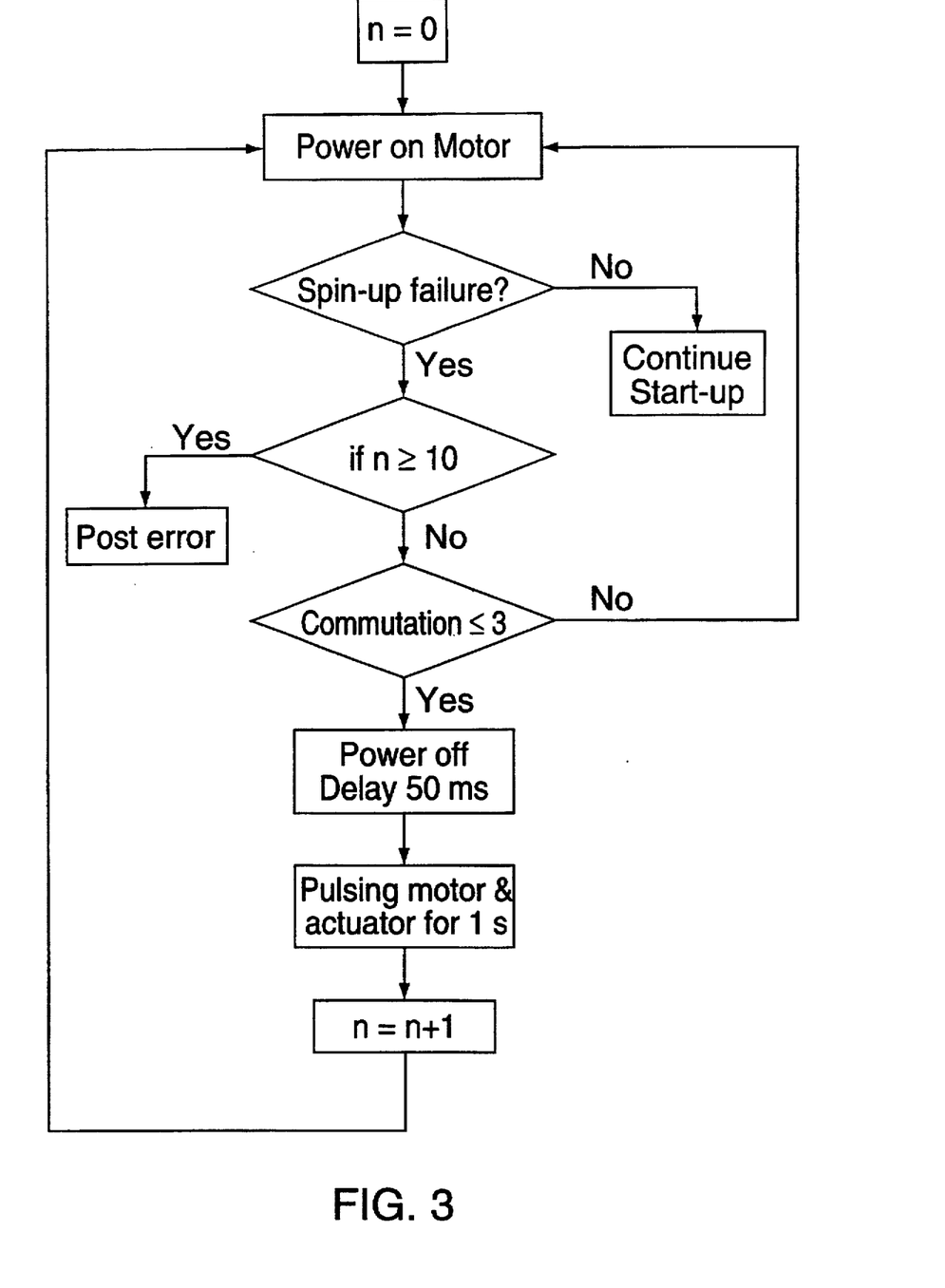
FIG. 3 is a flow diagram of the firmware according to the present invention.

As shown in FIG. 3, the firmware according to the present invention first checks feedback signals from the spindle motor to see if an error in the normal start-up sequence of the disk drive has occurred. If an error occurs, the firmware checks whether the error is related to a stiction event, as for example when the commutation count is smaller than or equal to 3. If the error is indeed stiction related, the pulsing sequence will be initiated after a short delay (50 milliseconds, for example). After pulsing the spindle motor and the actuator, the heads should be free from the disk surfaces, and the new trial will be made to spin-up the disks 22. If a trial of the stiction release code failed to break free the heads from the disk surfaces, the stiction release code would be executed up to, for example, 10 times before the drive poses an error in start-up message.

By pulsing the voltage to the spindle motor 29 at a resonant frequency of the spindle motor, the force generated by the spindle motor at each pulse is positively reenforced and effectively amplified. For the heads 24a–h which are stuck to the respective surfaces of disks 22a–d, amplification of the spindle motor power output will create a large shear stress at the head/disk interface, which stress will tend to break the heads free of the disk surfaces.

However, when the heads have been at rest on the landing zone, it is possible that only some of the heads have adhered to the surface of the disks, while other heads have not. Upon start-up of the disk drive, therefore, it is not known how many of the heads are in fact stuck to the surfaces of the disks.

The frequency at which resonance occurs for the spindle motor is dependent on several drive characteristics, including the moment of inertia of the disk pack and the cumulative adhesive force of each of the stuck heads together. As such, the resonant frequencies for the spindle motor will vary depending on how many of the heads 24a–h are actually stuck to disks 22a–d upon the start-up sequence of the drive. A disk drive having, for example, eight heads will potentially have eight different resonant frequencies, with the resonant frequency at any given time being determined by the actual number of heads stuck to the disks at that time. Where, for example, there are a large number of heads stuck to the disks, the resonant frequency will be relatively high. Conversely, where there are a small number of heads stuck to the disks, the resonant frequency will be relatively low.

Therefore, the present invention contemplates pulsing the spindle motor 29 over a range of discrete frequencies, which range includes at least resonant frequencies of the spindle motor corresponding to 1 head stuck, 2 heads stuck, etc., up to N heads stuck, where N equals the total number of heads in the disk drive. Each of the resonant frequencies corresponding to differing numbers of stuck heads may be experimentally determined for a particular disk drive. Alternatively, the range of frequencies may include discrete frequency increments that are sufficiently small so as to necessarily include at least the approximate resonant frequencies for the spindle motor corresponding to differing numbers of stuck heads.

The present invention further contemplates applying a force at the head/disk interface, which force may be applied in a plurality of directions around the head/disk interface. As explained in the Background of the Invention section, stiction in one direction may be smaller than stiction in another direction. By applying forces alternatively in various directions around the head/disk interface, the heads may be broken free from the disk surfaces in the direction in which stiction is at its minimum. Upon start-up of the disk drive, if the available motor torque cannot overcome the stiction force at the head/disk interface and fails to spin-up the disks, the electric current to the spindle motor and to the actuator may be rapidly fluctuated so as to cause fretting motions of the spindle motor and the actuator. The fretting motion of both the spindle motor and the actuator results a force generated in the slider with respect to the disk at each head/disk interface where stiction occurs. Moreover, the direction of this force will vary so as to be applied in a plurality of directions around the head/disk interface(s).

The resultant forces can be alternatively generated at the head/disk interface in a plurality of directions around the head/disk interface by pulsing the spindle motor and the actuator at a same frequency but with a phase lag of $\pi/2$. Another way of generating resultant forces in the plurality of directions is to pulse the spindle motor and the actuator simultaneously at the resonant frequency of the spindle motor. If the pulsing frequencies are close to the resonant frequencies of the motor or the actuator, the forced vibration at these frequencies will have a certain amount of phase lag. This phase lag will result in the resultant forces at the head/disk interface in a plurality of directions.

The following are examples of pulsing sequences according to the present invention:

EXAMPLE 1

Figure 4:
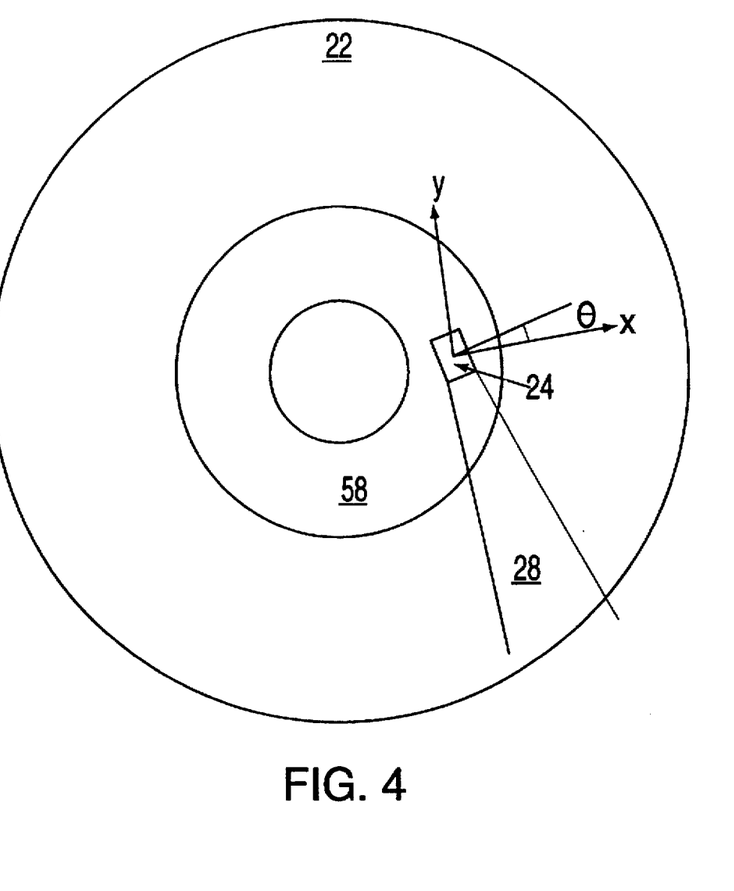
FIG. 4 is a representation of pulsing to the motor and the actuator.
Figure 5:
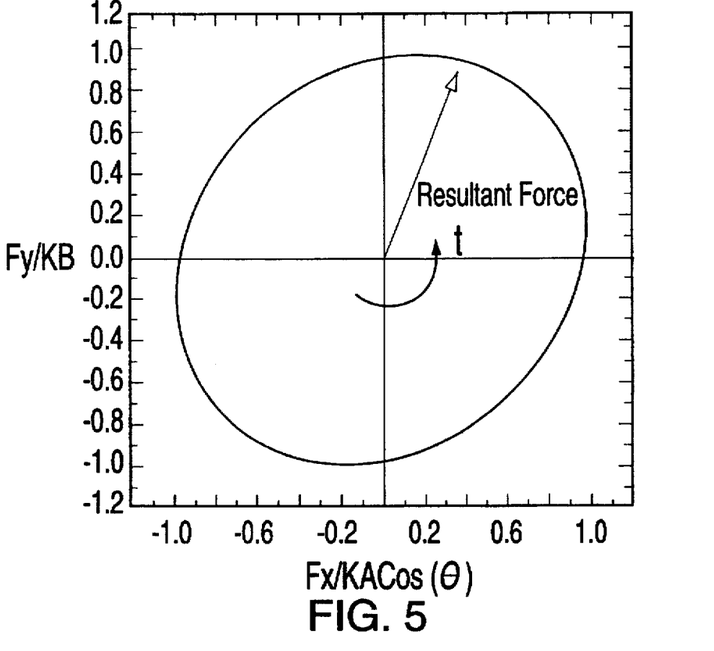
FIG. 5 is a graph of force vectors created at the head/disk interface according to the present invention.

Both the motor and the actuator are pulsed at $\omega$ Hz, while the pulse to the actuator has a phase lag of $\pi/2$. If the frequency of $\omega$ Hz is far away from the resonant frequency of the spindle motor or the actuator, the fretting motion of the disks 22 in the circumferential direction, y, (FIG. 4) and the fretting motion of the actuator in the radial direction, x, can be described as follows:

$$x = A \cos\theta \cos\omega t \quad (1)$$

$$y = B \sin\omega t + A \sin\theta \cos\omega t \quad (2)$$

where $\theta$ is the skew angle of the heads 24 relative to the radial direction; $\omega$ is the pulsing frequency; t is the time; A and B are the amplified constants of the spindle motor and the actuator, respectively. The forces generated from the relative motion of the disks 22 and the heads 24 in x and y directions are given by:

$$F_x = kA \cos\theta \cos\omega t \quad (3)$$

$$F_y = kB \sin\omega t + kA \sin\theta \cos\omega t \quad (4)$$

combining equations (3) and (4):

$$\left(\frac{F_x}{kA\cos\theta}\right)^2 + \left(\frac{F_y}{kB}\right)^2 = 1 + \left(\frac{A}{B}\sin\theta\cos\omega t\right)^2 + \frac{2A}{B}\sin\theta\sin\omega t\cos\omega t \quad (5)$$

where k is stiffness of the head/disk interface. It is apparent that the contour of the resultant force given by equation (5) is an ellipse. FIG. 5 shows indeed that the direction of resultant force is following the contour of an ellipse for a skew angle of 10 degrees and where the amplified constants A and B are equal to each other. For the resultant force being generated through 360° around the ellipse, the pulsing of the spindle motor and the actuator is applied for $2\pi/\omega$ seconds. For example, 0.209 seconds are needed for the pulsing frequency of 30 Hz and about 63 milliseconds are needed for the pulsing frequency of 100 Hz.

EXAMPLE 2

Figure 6:
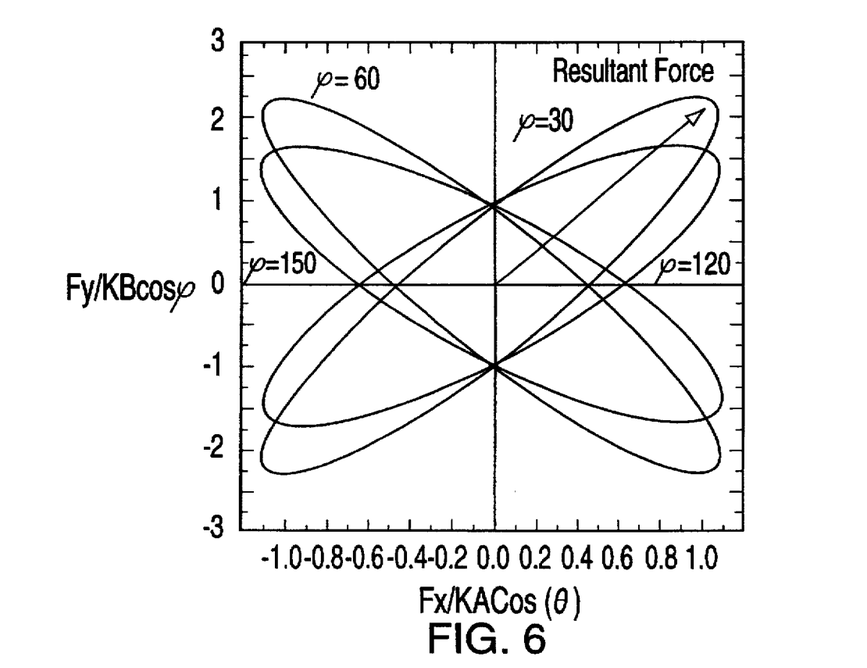
FIG. 6 is a graph of force vectors created at the head/disk interface according to an alternative embodiment of the present invention.

Both the motor and the actuator are pulsed at $\omega$ Hz, while the pulse to the actuator has a phase lag of $\pi/2$. If the frequency of $\omega$ Hz is close to the resonant frequency of the spindle motor, then the forces generated from the relative motion of the disks 22 and the heads 24 in x and y directions are given by:

$$F_x = kA \cos\theta \cos\omega t \quad (6)$$

$$F_y = kB \sin(\omega t + \phi) + kA \sin\theta \cos\omega t \quad (7)$$

combining equations (6) and (7):

$$\left(\frac{F_x}{kA\cos\theta}\right)^2 + \left(\frac{F_y}{kB\cos\phi}\right)^2 = $$

$$1 + \cos^2\omega t \left(\tan^2\phi + \frac{A^2\sin^2\theta}{B^2\cos^2\phi} + \frac{2A\sin\theta}{B\cos\phi}\right) + $$

$$\cos 2\omega t \left(\tan\phi + \frac{2A\sin\theta\tan\phi}{B\cos\phi}\right) \quad (8)$$

where $\phi$ is the phase shift due to the forced vibration at the frequency close to the resonant frequency of the spindle motor. It is apparent also that the contour of the resultant force given by equation (8) is an ellipse. Since the spindle motor is pulsed at the frequency close to the resonant frequency, an amplified force will be generated at the head/disk interface in the direction of the disk rotation. But the fretting motion of the actuator with a phase lag will cause the resultant (amplified) force to change directions along an ellipse. FIG. 6 shows that the direction of resultant forces are following the contour of ellipses for different values of $\phi$.

EXAMPLE 3

Both the motor and the actuator are pulsed at $\omega_1$, $\omega_2$, $\omega_3$, ... Hz, sequentially in a reverse order, while the pulse to the actuator has a phase lag of $\pi/2$ but at the same frequency. The frequencies of $\omega_1$, $\omega_2$, $\omega_3$, ... Hz are the resonant frequencies of the spindle motor corresponding to one head, two heads, three heads, etc., being stuck to the disk surfaces. These frequencies can be predetermined by experimental measurements. For a 3½ inch form factor disk drive, for example, the resonant frequencies range from 50 Hz to 400 Hz, while the resonant frequency of the actuator is much higher, around 2 kHz. As shown in the Example 2, pulsing at the discrete frequencies will have the same effect in generating resultant forces in all the directions. Since the frequencies, $\omega_1$, $\omega_2$, $\omega_3$, ... Hz, are resonant frequencies of the spindle motor corresponding to one head, two heads, three heads, etc., being stuck to the disk surfaces, the firmware essentially issues a pulsing sweep so that the heads can be broken free from the disk surfaces in most efficient way regardless how many heads are stuck to the disk surfaces.

EXAMPLE 4

The motor is pulsed at $\omega_1$ Hz and the actuator is pulsed at $\omega_2$ Hz. Then the forces generated from the relative motion of the disks 22 and the heads 24 in x and y directions are given by $$F_x = kA \cos\theta \cos\omega_1 t \quad (9)$$

$$F_y = kB \cos\omega_2 t + kA \sin\theta \cos\omega_1 t \quad (10)$$

combining equations (9) and (10):

$$\left(\frac{F_x}{kA\cos\theta}\right)^2 + \left(\frac{F_y}{kB}\right)^2 = \cos^2\omega_1 t + (\cos\omega_2 t + A/B\sin\theta\cos\omega_1 t)^2 \quad (11)$$

The contour of the resultant force given by equation (11) may also generate a resultant force through 360° around an ellipse, with the amplitude of the resultant forces changing with time.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. For use in a disk drive comprising a storage disk having data tracks and a landing zone, a spindle motor for rotating storage disk, a head for transferring data to and from the data tracks and arranged to fly above the data tracks during a period of operation of the disk drive and to contact the landing zone during a period of non-operation of the disk drive, an actuator for controllably positioning the head at preselected radial positions of the disk including the data tracks and the landing zone, and control electronics to control operation of the spindle motor and the actuator by transmitting control signals, a method for overcoming stiction between the head and the landing zone upon transition from non-operation to operation of the disk drive by operating the control electronics, during transition from non-operation to operation of the disk drive, to generate control signals, comprising the steps of:

i) pulsing the spindle motor at a first preselected frequency to apply a force that frets the motion of the storage disk in the circumferential direction, ii) pulsing the actuator at a second preselected frequency to apply a force that frets the motion of the actuator in the radial direction, and iii) coordinating the pulsing of the spindle motor and the actuator to cause a resulting force acting upon the head at the contact between the head and the landing zone that changes angular direction and includes a direction of least stiction between the head and the landing zone.

2. The method of claim 1, wherein the first frequency equals the second frequency and the second frequency is out of phase relative to the first frequency.

3. The method of claim 2, wherein the second frequency is out of phase relative to the first frequency by a period equal to $\pi/2$.

4. The method of claim 1, wherein the first frequency equals the second frequency, which frequency has a value approximately equal to a resonant frequency of the spindle motor or actuator.

5. The method of claim 4, wherein the second frequency is out of phase relative to the first frequency.

6. The method of claim 5, wherein the second frequency is out of phase relative to the first frequency by a period equal to $\pi/2$.

7. For use in a disk drive comprising a stack of storage disks, each having data tracks and a landing zone, a spindle motor for rotating the stack of storage disks, a plurality of heads n, each one of the heads for transferring data to and from the data tracks of a respective one of the stack of storage disks and arranged to fly above the respective data tracks during a period of operation of the disk drive and to contact the respective landing zone during a period of non-operation of the disk drive, a plurality of actuators, each one of the actuators for controllably positioning a respective one of the plurality of heads at preselected radial positions of the disk corresponding to the respective one of the heads including the data tracks and the landing zone, and control electronics to control operation of the spindle motor and the actuators by transmitting control signals, a method for overcoming stiction between the heads and the landing zones upon transition from non-operation to operation of the disk drive by operating the control electronics, during transition from non-operation to operation of the disk drive, to generate control signals, comprising the steps of:

i) pulsing the spindle motor at each of a first preselected set of frequencies to apply a force that frets the motion of the storage disk in the circumferential direction, ii) pulsing the actuators at each of a second preselected set of frequencies to apply a force that frets the motion of the actuator in the radial direction, and iii) coordinating the pulsing of the spindle motor and the actuators to cause a resulting force acting upon the head at the contact between the head and the landing zone that changes angular direction and includes a direction of least stiction between the head and the landing zone.

8. A method as claimed in claim 1 including the step of pulsing the spindle motor and the actuator at the same frequency.

9. The method of claim 8, wherein the step of pulsing the spindle motor at said first preselected set of frequencies includes a first frequency corresponding to a first resonant frequency of the spindle motor when one of the heads is held by stiction to its respective landing zone, a second frequency corresponding to a second resonant frequency of spindle motor when two of the heads are held by stiction to their respective landing zones, and continuing said pulsing step utilizing each resonant frequency of said set up to a resonant frequency of the motor corresponding to all of said n heads being stuck.

10. A method as claimed in claim 9 wherein said spindle motor and said actuator are each pulsed at different frequencies of said first and second sets of resonant frequencies of said spindle motor.

11. A method as claimed in claim 10 wherein said first and second sets of frequencies include substantially the same resonant frequencies of the motor.

12. A method as claimed in claim 11 wherein the frequency at which the actuator is pulsed is out of phase relative to the frequency at which the motor is pulsed by a period of $\pi/2$.

13. A disk drive comprising:

a storage disk having data tracks and a landing zone;

a spindle motor, responsive to control signals, for rotating storage disk;

a head for transferring data to and from the data tracks and arranged to fly above the data tracks during a period of operation of the disk drive and to contact the landing zone during a period of non-operation of the disk drive;

an actuator responsive to control signals to controllably position the head at preselected radial positions of the disk including the data tracks and the landing zone; and control electronics operating during a transition from non-operation to operation of the disk drive, to generate the control signals to:

i) pulse the spindle motor at a first preselected frequency to apply a force that frets the motion of the storage disk in the circumferential direction, ii) pulse the actuator at a second preselected frequency to apply a force that frets the motion of the actuator in the radial direction, and iii) coordinate the pulsing of the spindle motor and the actuator to cause a resulting force acting upon the head at the contact between the head and the landing zone that changes angular direction and includes a direction of least stiction between the head and the landing zone.

14. The disk drive of claim 13, wherein the first frequency equals the second frequency and the second frequency is out of phase relative to the first frequency.

15. The disk drive of claim 14, wherein the second frequency is out of phase relative to the first frequency by a period equal to $\pi/2$.

16. The disk drive of claim 13, wherein the first frequency equals the second frequency, which frequency has a value substantially unequal to a resonant frequency of the spindle motor or actuator.

17. The disk drive of claim 13, wherein the first frequency equals the second frequency, which frequency has a value approximately equal to a resonant frequency of the spindle motor or actuator.

18. The disk drive of either one of claims 16 and 17, wherein the second frequency is out of phase relative to the first frequency.

19. The disk drive of claim 18, wherein the second frequency is out of phase relative to the first frequency by a period equal to $\pi/2$.

20. A disk drive comprising:

a stack of storage disks, each having data tracks and a landing zone;

a spindle motor, responsive to control signals, for rotating stack of storage disks;

a plurality of heads, each one of the heads for transferring data to and from the data tracks of a respective one of the stack of storage disks and arranged to fly above the respective data tracks during a period of operation of the disk drive and to contact the respective landing zone during a period of nonoperation of the disk drive;

a plurality of actuators, each one of the actuators responsive to control signals for controllably positioning a respective one of the plurality of heads at preselected radial positions of the disk corresponding to the respective one of the heads including the data tracks and the landing zone; and control electronics operating during a transition from non-operation to operation of the disk drive, to generate the control signals to:

i) pulse the spindle motor at each of a first preselected set of frequencies to apply a force that frets the motion of the storage disk in the circumferential direction, ii) pulse the actuators at each of a second preselected set of frequencies to apply a force that frets the motion of the actuator in the radial direction, and iii) coordinate the pulsing of the spindle motor and the actuators to cause a resulting force acting upon the head at the contact between the head and the landing zone that continuously changes angular direction and includes a direction of least stiction between the head and the landing zone.

21. The disk drive of claim 20, wherein the first preselected set of frequencies includes at least a frequency corresponding to the resonant frequency of the spindle motor when one of the heads is held by stiction to its respective landing zone, a frequency corresponding to the resonant frequency of the spindle motor when two of the heads are held by stiction to their respective landing zones, and a frequency equal to the number of heads in the plurality of heads.

22. In a disk drive including one or more heads up to n heads supported on a movable actuator for radial movement across a data recording surface of a plurality of discs for transferring data to and from the data surfaces of said plurality of disks, and a motor means for causing rotation of said discs for creating relative motion between the one or more heads and the plurality of disks, a method for overcoming stiction between the one or more heads and the plurality of disks, comprising the step of pulsing the motor means at least at one frequency of a set of resonant frequencies of said motor, the set of resonant frequencies being a function of the number of said n heads stuck to an associated surface of said discs, over a range set of frequencies and substantially simultaneously pulsing the actuator at a different frequency of said set of frequencies to amplify a force exerted at stiction interfaces between the one or more heads and the respective surfaces of the plurality of storage disks.

23. The method for overcoming stiction as recited in claim 22, wherein the of frequencies includes at least approximate resonant frequencies of the motor means with 1 head stuck, 2 heads stuck, ..., up to n heads stuck, where n equals the total number of heads in the one or more heads.

24. In a disk drive including one or more heads supported on a movable actuator for transferring data to and from a plurality of disks, and a spindle motor for rotating the plurality of disks, a method for overcoming stiction between the one or more heads and the plurality of disks, comprising the steps of pulsing the spindle motor over a range of predetermined frequencies, said predetermined frequencies including at least approximate resonant frequencies of the spindle motor with various numbers of heads stuck to the plurality of disks and simultaneously pulsing said actuator over said range of frequencies.

25. The method of claim 24, wherein the various numbers of heads stuck varies from 1 to N, where N equals the total number of heads in the one or more heads.

26. The method of claim 24, wherein pulsing of said spindle motor occurs at no greater than four-hundred hertz (400 Hz) and no less than fifty hertz (50 Hz).

27. In a disk drive including a head and disk assembly having one or more heads for transferring data to and from a plurality of disks, a spindle motor for rotating the plurality of disks, and an actuator assembly for positioning the one or more heads with respect to the plurality of disks, a method for overcoming stiction between the one or more heads and the plurality of disks, comprising the steps of:

pulsing the spindle motor over a range of discrete frequencies, said discrete frequencies including at least approximate resonant frequencies of the head and disk assembly for 1 to N heads stuck, where N equals the total number of heads in the one or more heads; and pulsing the actuator assembly.

28. The method of claim 27, wherein the spindle motor is pulsed in a direction substantially orthogonal to a direction in which the actuator assembly is pulsed.

29. A disk drive including means for overcoming stiction of a plurality of heads on respective surfaces of at least one storage disk upon start-up of the disk drive, comprising:

a housing;

a head and disk assembly, including:
 the at least one storage disk within said housing for storing data, the at least one storage disk including a landing zone;
 rotating means for rotating the at least one storage disk, the plurality of heads for transferring said data to and from the at least one storage disk, and
 a plurality of bearing means on which the plurality of heads are mounted, said plurality of bearing means resting on a section of said landing zone on each of the at least one storage disks during nonoperational periods of the disk drive; and control means for controlling said transfer of data and for controlling the rotation of said rotating means, said control means further including means for pulsing said rotating means over a range of frequencies, said range of frequencies including at least approximate resonant frequencies of said head and disk assembly corresponding to 1 stuck head, 2 heads stuck, ..., up to N heads stuck, where N equals the total number of heads in the plurality of heads, said pulsing means provided to free said bearing means from said landing zone on each of the at least one storage disks upon start-up of the disk drive.

30. The disk drive of claim 29, wherein said rotating means pulses at no greater than four-hundred hertz (400 Hz) and no less than fifty hertz (50 Hz).

31. A disk drive as recited in claim 29, further comprising:

actuator means within said housing for positioning the plurality of heads with respect to the at least one storage disk; and wherein said control means further includes second pulsing means for pulsing said actuator means, said second pulsing means provided to free said bearing means from said landing zone on each of the at least one storage disks upon start-up of the disk drive.

32. A method as claimed in claim 8 wherein the motor and the actuator are pulsed at said set of frequencies sequentially in a reverse order from said resonant frequency when said n heads are stuck to said resonant frequency when said one head is stuck.

33. A method as claimed in claim 8 wherein said second frequency is out of phase with said first frequency.

34. A method as claimed in claim 33 wherein said second frequency is out of phase with said first frequency by a period equal to $\pi/2$.

* * * * *